United States Patent [19]

Strolle et al.

[11] Patent Number: 5,550,596
[45] Date of Patent: Aug. 27, 1996

[54] DIGITAL TELEVISION SIGNAL PROCESSING SYSTEM INCLUDING A CO-CHANNEL REJECTION FILTER

[76] Inventors: Christopher H. Strolle, 275 Bickley Rd., Glenside, Pa. 19038; Steven T. Jaffe, 90 Eaglenest Rd., Freehold, N.J. 07728

[21] Appl. No.: 345,031

[22] Filed: Nov. 25, 1994

[51] Int. Cl.$^6$ .......................... H04N 5/445; H04N 5/213
[52] U.S. Cl. .................... 348/607; 348/471; 348/726; 375/233
[58] Field of Search .................... 348/21, 607, 471, 348/608, 609, 611, 726, 725; 375/316, 229, 230, 233, 355; 455/63, 308; H04N 5/455, 5/213

[56] References Cited

U.S. PATENT DOCUMENTS

| | | | |
|---|---|---|---|
| 5,087,975 | 2/1992 | Citta et al. | 348/726 |
| 5,132,797 | 7/1992 | Citta | 358/167 |
| 5,134,464 | 7/1992 | Basile et al. | 358/143 |
| 5,325,188 | 6/1994 | Scarpa | 348/624 |
| 5,345,476 | 9/1994 | Tsujimoto | 375/233 |
| 5,367,536 | 11/1994 | Tsujimoto | 375/233 |
| 5,386,239 | 1/1995 | Wang et al. | 348/472 |

OTHER PUBLICATIONS

"VSB Transmission System", Zenith Corporation, Dec. 1993, pp. 1–25.
Digital Communication, by Lee and Messerschmitt, Kluwer Academic Publishers, Copyright 1988, pp. 184–186.
1994 Proceedings of the National Association of Broadcasters, 48th Annual Engineering Conference Proceedings, Mar. 20–24, 1994 contains Grand Alliance HDTV System Specification Draft.
Performance of Equalization Techniques in a Radio Interference Environment, by Niger et al., IEEE Transactions on Communications vol. 39, No. 3, Mar. 1991.

*Primary Examiner*—Safet Metjahic
*Assistant Examiner*—Jeffrey A. Murrell
*Attorney, Agent, or Firm*—Joseph S. Tripoli; Eric P. Herrmann; Ronald H. Kurdyla

[57] ABSTRACT

A digital signal processing system for receiving and processing a high definition television signal, eg., in a Pulse Amplitude Modulation (PAM) format, includes a filter for rejecting interferer signals such as a narrowband continuous wave NTSC co-channel interferer. In an illustrated embodiment the rejection filter is a digital FIR filter (18) located after a (de)rotator (16) in a carrier recovery network (16, 20, 24, 26, 28). The filter exhibits a zero throughput delay bandpass response with attenuation notches for rejecting NTSC co-channel picture and chrominance baseband carrier frequencies.

13 Claims, 3 Drawing Sheets

5,550,596

DIGITAL TELEVISION SIGNAL PROCESSING SYSTEM INCLUDING A CO-CHANNEL REJECTION FILTER

BACKGROUND OF THE INVENTION

This invention is related to the field of digital signal processing, and more particularly to a television signal receiver system including a filter for rejecting co-channel interference.

Recent developments in the field of video signal processing have produced digital high definition television (HDTV) signal processing and transmission systems. An HDTV terrestrial broadcast system recently proposed as the Grand Alliance system in the United States employs a digital transmission format for transmitting a packetized datastream. The Grand Alliance HDTV system is a proposed transmission standard that is under consideration in the United States by the Federal Communications Commission through its Advisory Committee on Advance Television Services (ACATS). A description of the Grand Alliance HDTV system as submitted to the ACATS Technical Subgroup on Feb. 22, 1994 (draft document) is found in the 1994 Proceedings of the National Association of Broadcasters, 48th Annual Broadcast Engineering Conference Proceedings, Mar. 20–24, 1994.

The proposed Grand Alliance HDTV system is a simulcast system. In such a system, two versions of the same program material may be broadcast simultaneously via separate standard 6 MHz channels. One of the two program versions contains standard definition NTSC information broadcast on one channel, while the other contains high definition information broadcast on the other 6 MHz channel. In practice, a simulcast system may utilize two adjacent 6 MHz NTSC channels, eg., VHF channels 3 and 4, to convey the standard and high definition information, respectively. The high definition version of a simulcast system can be implemented in a standard 6 MHz channel by using data compression techniques. The standard NTSC information and the HDTV information are received independently by respective standard NTSC and HDTV receivers. When standard NTSC receivers are eventually replaced by HDTV or dual-standard receivers, the channels used by standard NTSC signals will become available for other purposes. Thus the simulcast concept prevents the vast number of pre-existing standard NTSC receivers from becoming obsolete as soon as HDTV broadcasting is introduced, and permits expanded broadcasting services in the future when the channels occupied by standard NTSC signals become available.

The rejection of co-channel interference is a factor in a simulcast system since co-channel interference may severely degrade or disrupt the operation of a high definition television receiver. Co-channel interference may result when two different television signals are transmitted on the same broadcast channel and are received simultaneously. The interfering signal components typically are the picture carrier (located 1.25 MHz from the lower band edge), the chrominance subcarrier (located 3.58 MHz higher than the picture carrier) and the sound carrier (located 4.5 MHz higher than the picture carrier). The likelihood of co-channel interference occurring is a function of various factors, such as the broadcast distance between the two channels and the transmission power of the channels, for example.

SUMMARY OF THE INVENTION

In accordance with the principles of the present invention, a digital signal processing system for receiving and processing a high definition television signal, eg., in a Quadrature Amplitude Modulation (QAM) format or a Vestigial Sideband (VSB) format, includes a network for rejecting an interferer signal such as a continuous wave NTSC co-channel interferer signal using an FIR filter in a carrier recovery loop. In an illustrated embodiment, co-channel rejection is accomplished by an FIR digital filter following an equalizer and situated in a carrier recovery loop which brings a near-baseband signal to baseband. The filter enhances the performance of both the equalizer and the carrier recovery network.

DETAILED DESCRIPTION OF THE DRAWINGS

Figure 1:
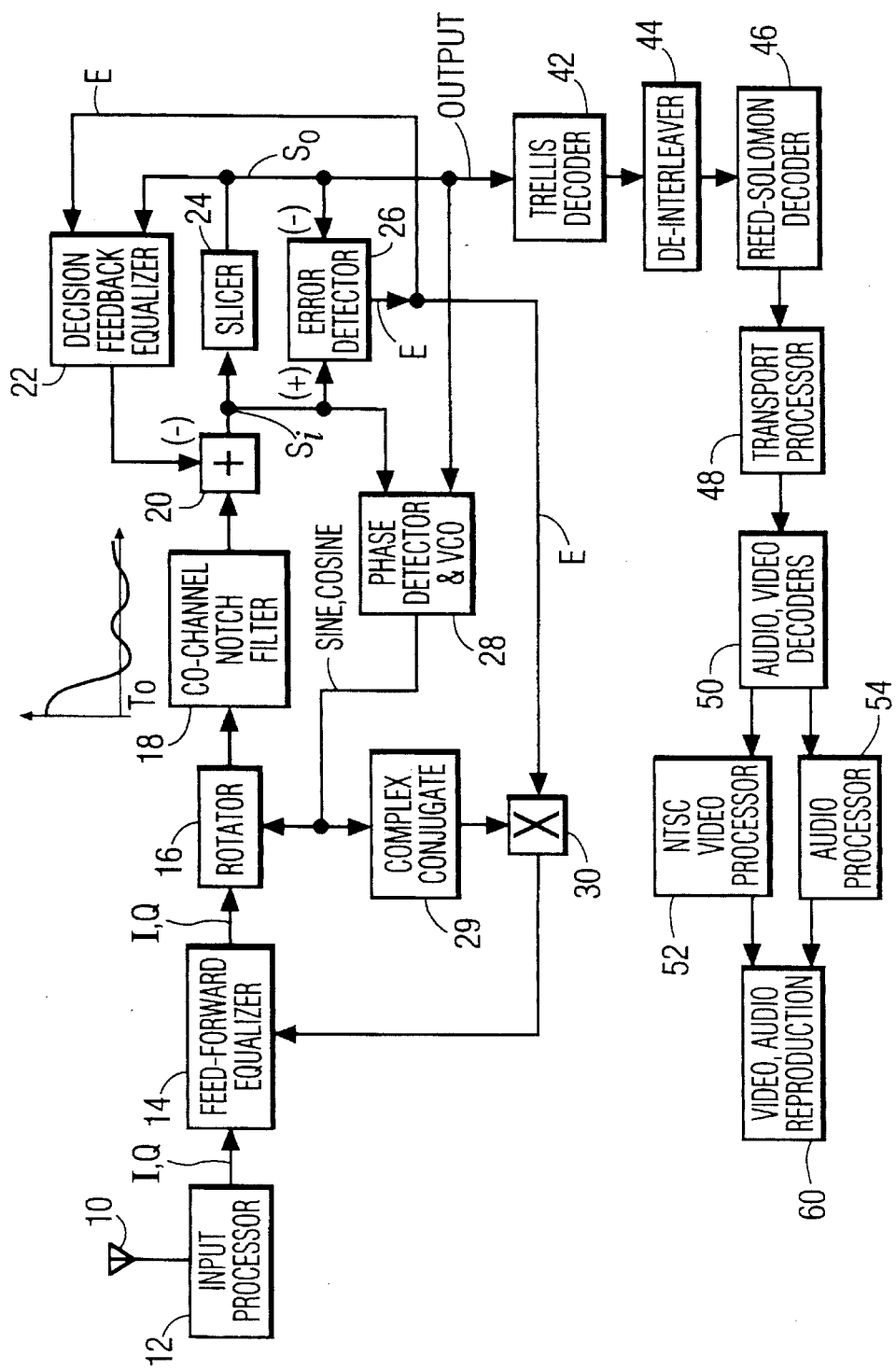
FIG. 1 is a block diagram of a portion of a high definition television receiver system including a co-channel notch filter network in accordance with the principles of the present invention.

FIG. 1 is a block diagram of a portion of a high definition digital television signal receiver. In this example a QAM signal, which is a type of pulse amplitude modulated (PAM) signal, is received and processed. As is known, in a QAM symbol transmission system a transmitted data symbol is represented by quadrature components which modulate respective quadrature phased carriers at a given frequency. Each symbol is mapped (assigned) to a prescribed coordinate in a four-quadrant grid-like constellation. In a 32-QAM system for example, each quadrant of the constellation contains eight symbols at prescribed coordinates with respect to I and Q quadrature axes.

A broadcast high definition QAM television signal received by an antenna 10 is applied to an input processor 12. Processor 12 includes a tuner and intermediate frequency (IF) stage for down-converting the received signal to a lower frequency band above baseband, automatic gain control networks, and an analog-to-digital converter, for example. Input processor 12 may also include networks for Nyquist-rate sampling a bandpass filtered input signal, phase splitting the filtered input signal into quadrature I, Q components, performing a preliminary demodulation, and performing twice symbol rate sampling prior to feed-forward equalizer 14. The preliminary demodulation brings the signal close to baseband so that the receiver does not have to operate on the high frequency input signal. Also included in input processor 12 (but not shown to simplify the drawing) is a timing/clock recovery network for developing a symbol rate clock from the received QAM signal. Timing/clock recovery networks for recovering a symbol rate clock from a received signal are well known and are described, for example, in the reference text Digital Communication, Lee and Messerschmitt (Kluwer Academic Press, Boston, Mass., USA, 1988).

A passband I, Q digital QAM signal from unit 12 is processed by passband feed forward adaptive equalizer 14, eg., a fractionally spaced equalizer, which conditions the signal before further processing. Specifically, equalizer 14 includes an adaptive digital FIR filter which compensates for transmission channel perturbations such as frequency/phase irregularities. Equalizer 14 responds to dynamically updated filter coefficients generated in response to a control signal as will be discussed, after an initialization interval during which equalizer 14 is initialized using blind equalization or using training signal techniques.

An equalized passband signal from equalizer 14 is complex in nature with Real and Imaginary components, and may be at or near baseband. This signal may be symbol rate sampled before being processed by a rotator 16, which is sometimes referred to as a de-rotator in view of its function in a carrier recovery network for bringing near-baseband signal frequencies to baseband signal frequencies. Rotator 16, eg., a complex multiplier as known, compensates for a dynamic phase error manifested by a slight rotation of the received QAM constellation. This error may be produced by a variety of factors including local oscillator frequency variations, for example. The constellation phase error/rotation may be significantly reduced or eliminated by the carrier recovery network, the operation of which resembles a baseband demodulator. In this example the carrier recovery network includes a control loop comprising rotator 16, adder 20, slicer 24, error detector 26 and a phase detector and voltage controlled oscillator (VCO) network 28, which develop an error signal E for use as will be discussed. Units 16, 24, 26 and 28 comprise the essential elements of a digital phase locked loop (PLL) for eliminating the dynamically varying carrier offsets. The carrier recovery loop also advantageously includes a co-channel rejection filter 18 as will be discussed.

Figure 2:
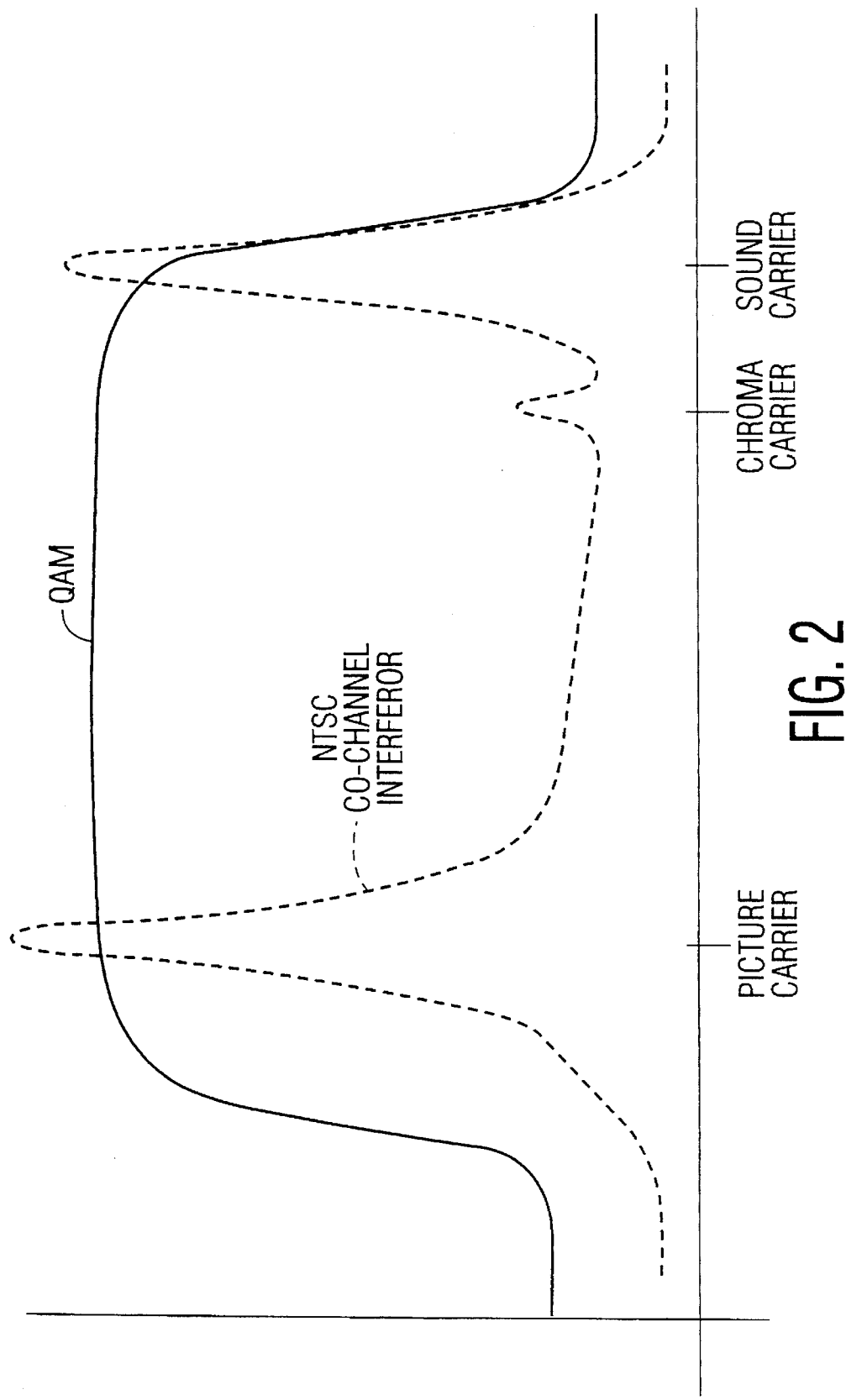
FIG. 2 illustrates amplitude-frequency responses for baseband QAM and NTSC co-channel signals.
Figure 3:
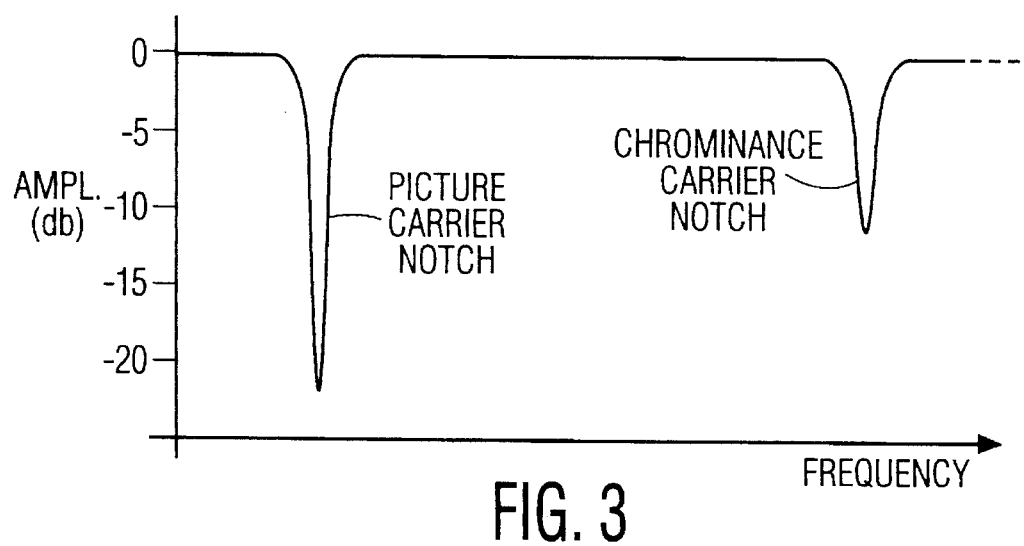
FIG. 3 illustrates an amplitude-frequency response of the notch filter network in the system of FIG. 1.
Figure 4:
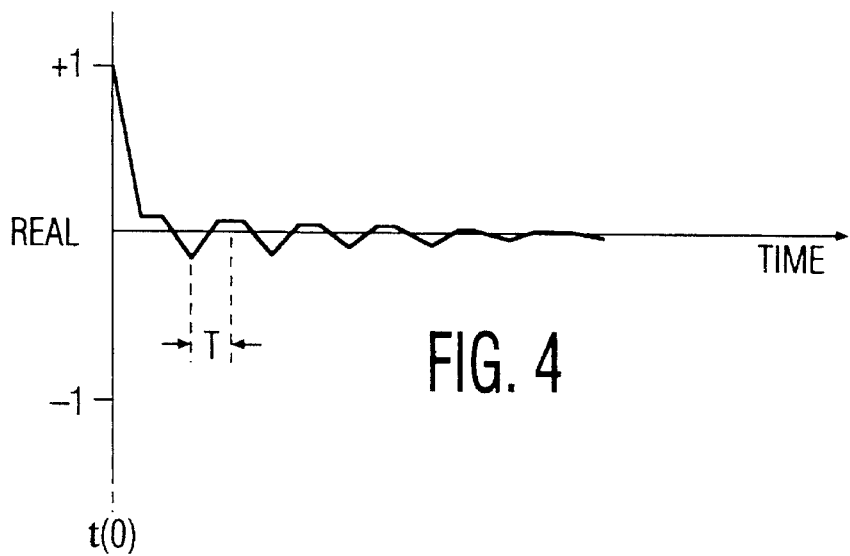
FIGS. 4 and 5 respectively show the Real and Imaginary time domain responses of the filter network of FIG. 1.
Figure 5:
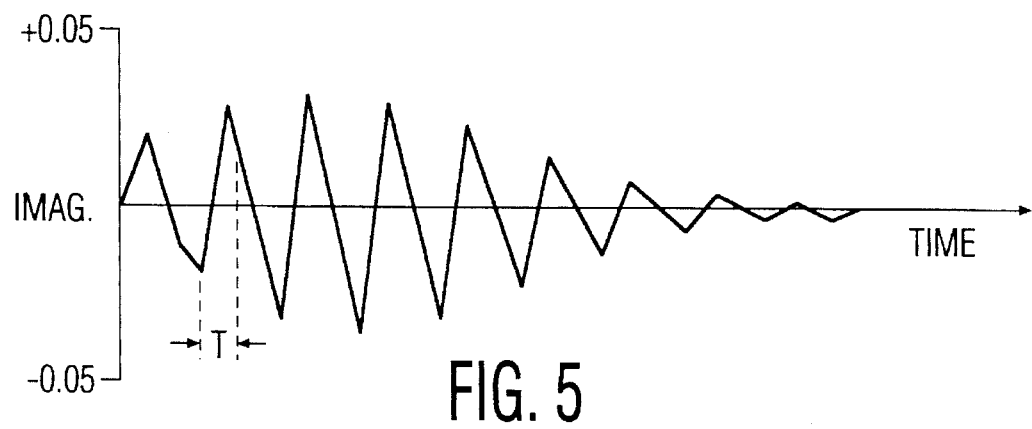

The received QAM signal may be contaminated with an NTSC co-channel interferer information as shown in FIG. 2, which illustrates the amplitude-frequency spectrum of the QAM signal relative to narrowband co-channel NTSC interferer components at the picture carrier and chrominance carrier frequencies. To reject the co-channel interferer components, co-channel notch filter 18 in accordance with the principles of the present invention is included in the control loop described above, after rotator 16. Filter 18 processes baseband (and near-baseband) signals from rotator 16 with an amplitude-frequency response as shown in FIG. 3, with high attenuation (notches) at the picture carrier and chrominance subcarrier baseband frequencies. The Real and Imaginary time domain responses of filter 18 are illustrated by FIGS. 4 an 5, respectively, where T designates a symbol interval.

Filter 18 is a linear phase causal bandpass digital FIR filter with substantially zero throughput delay. The Z-transform domain output response N(z) of filter 18 is defined by the expression $$N(z) = 1 + Z^{-1}C(z)$$

The term C(z) in the above expression represents the trailing response of filter 18. The coefficients of filter 18 are weighted to provide the described attenuation notches at the baseband picture and chrominance carrier frequencies.

Referring to FIGS. 2 and 3, it is seen that the filter 18 response does not include a rejection notch at the sound carrier frequency at the high end of the baseband. This is because, in this example, the system parameters are chosen so that the sound carrier resides on the Nyquist slope in the excess bandwidth region (i.e., the filter slope at the high frequency end). Nulls for the audio carrier may also be created by equalizer 14.

It is noted that filter 18 is advantageously located after rotator 16 in the carrier recovery network. In this regard the inventors have observed that if filter 18 is placed before feed-forward equalizer 14 and a carrier frequence offset is present, the filter attenuation notches will not be properly aligned with the picture and chrominance carrier frequencies that are to be attenuated. If the notch filter is positioned before the rotator, wider attenuation notches should be used to account for the possibility of a carrier frequency offset. The disclosed location of filter 18 after rotator 16 advantageously permits the use of narrow notches with a sharp attenuation characteristic at the co-channel frequencies to be attenuated, resulting in efficient filtering. In addition, the zero delay characteristic of filter 18 does not compromise the pull-in and tracking characteristics of the carrier recovery loop.

A notch filter corresponding to filter 18 may be used to reject any continuous wave interferer signal, not only co-channel NTSC picture and chrominance carrier frequencies as disclosed in the illustrated embodiment. Although filter 18 preferably exhibits a zero delay, a nominal amount of delay may be tolerated as a function of the operating parameters of a given system.

The filtered baseband output signal from filter 18 is applied to an additive input of a subtractive combiner 20, a subtractive (−) input of which receives an output signal from a decision feedback equalizer 22. The output signal from combiner 20 is processed by a slicer 24. Slicer 24 contains a mapping mechanism and is programmed to select the constellation symbol that is closest in distance to the received signal sample. The complex (I, Q) QAM constellation is divided into decision regions where each decision region is the set of points that is closest to some symbol. If, after examining a decision region for a symbol, a received symbol is found to be located at or offset in distance from an expected coordinate, slicer 28 produces an output symbol at the expected coordinate. The slicer output symbol differs from the slicer input symbol by the amount of any distance offset. The amount of any such offset is sensed by error detector 26, which produces an output error signal "E" as a function of the amount of the offset. This error signal is used to adjust the tap coefficients of equalizer 14 (via multiplier 30) and equalizer 22 so as to bring the error value to zero, such as through the use of a Least Mean Squared algorithm as is known.

Signals $S_i$ and $S_o$ at the input and output of slicer 24, respectively, are provided to a phase control unit 28 including a phase detector and voltage controlled oscillator (VCO) for generating output sine and cosine quadrature correction coefficients. Associated with each sine and cosine correction coefficient is an error correction phase angle which is a function of the value of error signal E. The output correction coefficients from phase control unit 28, and the QAM I, Q constellation components from equalizer 14, are provided to respective inputs of rotator 16 to perform the (de)rotating function for producing baseband output signals from rotator 16. It can be shown that any set of quadrature signals can be rotated to a desired angular position by performing a complex multiplication on the quadrature signals.

Decision directed feedback equalizer 22 processes the output signal of slicer 24, and has its coefficient values controlled as a function of the value of error signal E. Error signal E is also provided to one input of a complex multiplier 30, another input of which receives sine and cosine output signals from phase control unit 28. These signals are converted to complex conjugate form by a unit 29 before being applied to multiplier 30. An output passband error correction signal from multiplier 30 is applied to a control input of equalizer 14 for controlling the coefficient values of equalizer 14 to facilitate the equalizing operation.

Filter 18 advantageously enhances the performance of equalizer 14 by assuring that proper coefficient control signals are applied to equalizer 14 from unit 30. Since filter 18 is located in carrier recovery loop where a baseband signal is recovered, the co-channel rejection notches of filter 18 are accurately aligned with the associated baseband signal frequencies to be rejected. Consequently, error signal E and the coefficient control signals accurately reflect the baseband signal characteristics. This result would not be obtained if filter 18 preceded equalizer 14.

The placement of filter 18 also advantageously enhances the carrier recovery operation by providing an accurate signal at the input of slicer 24, i.e., a signal with properly rejected co-channel frequencies. Slicer 24 co-acts with error detector 26 to generate phase error signal E, which is used to control the coefficients of equalizers 14 and 22 as discussed.

The combination of elements 16, 20, 24, 26 and 28 form a carrier recovery loop for providing a baseband demodulated signal at the output of rotator 16. With the exception of filter 18 in accordance with the principles of the present invention, these elements form a carrier recovery loop as described in the Lee and Messerschmitt text mentioned earlier. This text also discusses the operation of feedback equalizer 22, and the coaction of multiplier 30 with feed-forward equalizer 14. Forward equalizer 14 is a filter that also removes some of the Inter Symbol Interference (ISI). Feedback equalizer 22 then removes the rest of the ISI, including any ISI generated by filter 18.

Decision feedback equalizer 22 may be preloaded with coefficients with function C(z) such that the overall response of equalizer 22 is related to the function $$\frac{1}{1+Z^{-1}C(z)}$$

This response effectively creates a noiseless pole which effectively cancels the notches created by the filter 18 response N(z) noted previously. The poles are noiseless since the input to unit 22 is the result of noiseless decisions from slicer 24.

The baseband Output signal from slicer 24 is decoded by means of a Viterbi decoder 42, de-interleaved by unit 44, subjected to Reed-Solomon error decoding by unit 46, and applied to a transport processor 48. Processor 48 transports a decoded output signal from unit 46 to appropriate decoders within unit 50 depending on the content of the signal from unit 46, eg., audio or video information. Transport processor 56 receives corrected data packets from unit 46 and examines the header of each packet to determine its routing. Audio and video output signals from unit 50 are respectively applied to an audio processor 54 and to an NTSC television video processor 52, which place the signals in a format suitable for reproduction by a unit 60.

Although the system of FIG. 1 was described in the context of a QAM input signal, other types of pulse amplitude modulation (PAM) input signals including QPSK signals may also be used, as well as vestigial sideband (VSB) input signals.

What is claimed is:

1. In a television receiver for receiving a television signal representative of digital video information, apparatus comprising:

an input signal translation network;

a first equalizer responsive to signals from said signal translation network;

a baseband demodulator responsive to an output signal from said equalizer; and a notch filter included in said baseband demodulator for filtering baseband and near-baseband video signals, said filter exhibiting a response including significant amplitude attenuation at a prescribed frequency for attenuating interferer signal components subject to contaminating said received signal.

2. Apparatus according to claim 1 and further comprising a second equalizer responsive to signals produced by said demodulator after filtering by said notch filter.

3. Apparatus according to claim 1, wherein said notch filter is a FIR digital filter for attenuating co-channel interferer signals at picture carrier and chrominance carrier frequencies; and said signal translation network is a frequency converter.

4. Apparatus according to claim 3, wherein said notch filter exhibits an upper bandedge excess frequency region encompassing a co-channel sound carrier frequency.

5. In a system for receiving a signal representative of digital video information, apparatus comprising:

an input processor;

an input equalizer responsive to signals from said input processor;

a carrier recovery network responsive to an output signal from said equalizer for providing a demodulated baseband video signal;

an output signal processor for processing said baseband video signal; and a filter included in said carrier recovery network for filtering baseband and near-baseband video signals, said filter exhibiting a response including significant amplitude attenuation at a prescribed frequency for attenuating .narrowband interferer signal components subject to contaminating said received signal.

6. Apparatus according to claim 5, wherein said filter is a digital FIR filter exhibiting substantially zero throughput delay.

7. Apparatus according to claim 5, wherein said received signal is a television signal subject to being contaminated by co-channel interference; and said filter provides significant attenuation at NTSC picture carrier and chrominance carrier frequencies.

8. In a system for receiving a signal representative of digital video information, apparatus comprising:

an input processor;

an input equalizer responsive to signals from said input processor;

a carrier recovery network responsive to an output signal from said equalizer for providing a demodulated baseband video signal;

an output signal processor for processing said baseband video signal; and a filter included in said carrier recovery network for filtering baseband and near-baseband video signals, said filter exhibiting a response including significant amplitude atenuation at a prescribed frequency for attenuating narrowband interferer signal components subject to contaminating said received signal; wherein said carrier recovery network comprises a feedback control loop including said filter.

9. In a system for receiving a signal representative of digital video information, apparatus comprising:

an input processor;

an input equalizer responsive to signals from said input processor;

a carrier recovery network responsive to an output signal from said equalizer for providing a demodulated baseband video signal;

an output signal processor for processing said baseband video signal; and a filter included in said carrier recovery network for filtering baseband and near-baseband video signals, said filter exhibiting a response including significant amplitude attenuation at a prescribed frequency for attenuating narrowband interferer signal components subject to contaminating said received signal; wherein said carrier recovery network includes a slicer with an input for receiving signals from said filter, and an output; and a decision feedback equalizer has an input for receiving output signals from said slicer and an output coupled to a point in said carrier recovery network prior to said slicer.

10. In a system for receiving a signal representative of digital video information, apparatus comprising:

an input processor;

an input equalizer responsive to signals from said input processor;

a carrier recovery network responsive to an output signal from said equalizer for providing a demodulated baseband video signal;

an output signal processor for processing said baseband video signal; and a filter included in said carrier recovery network for filtering baseband and near-baseband video signals, said filter being a digital FIR filter with substantially zero throughput delay and exhibiting a response including significant amplitude attenuation at a prescribed frequency for attenuating narrowband interferer signal components subject to contaminating said received signal; wherein said carrier recovery network includes a rotator responsive to output signals from said equalizer;

a slicer responsive to output signals from said rotator;

an error detector coupled to said slicer for providing an output error signal representing a phase error; and a phase control network responsive to input and output signals of said slicer; and wherein said filter is coupled between said rotator and said slicer for filtering output signals from said rotator.

11. In a system for receiving a television signal including a component representative of digital video information, apparatus comprising:

an input processor;

a feed-forward equalizer responsive to signals from said input processor; and a carrier recovery network responsive to an output signal from said equalizer for providing a demodulated baseband video signal, said carrier recovery network comprising a carrier recovery control loop including (a) a rotator responsive to output signals from said forward equalizer;

(b) a filter for filtering output signals from said rotator, said filter exhibiting significant attenuation of at least one of baseband picture carrier and chrominance carrier frequencies;

(c) a slicer responsive to output signals from said filter;

(d) an error detector coupled to said slicer for providing a phase error signal; and (e) a phase control network having an input responsive to an output signal from said slicer, and an output coupled to said rotator.

12. Apparatus according to claim 11 and further including a feedback equalizer having a signal input responsive to an output signal from said slicer, a control input responsive to said error signal, and an output coupled to an input of said slicer; and wherein said feed-forward equalizer is also responsive to said error signal.

13. Apparatus according to claim 11, wherein said received television signal is a Pulse Amplitude Modulated (PAM) signal.

* * * * *

UNITED STATES PATENT AND TRADEMARK OFFICE
CERTIFICATE OF CORRECTION

PATENT NO. : 5,550,596

DATED : August 27, 1996

INVENTOR(S) : Christopher H. Strolle et al.

It is certified that error appears in the above-identified patent and that said Letters Patent is hereby corrected as shown below:

Column 6, line 35:
Delete [ . ] after attenuating

Column 6, line 60: delete [atenuation] and insert ---attenuation---

Signed and Sealed this

Thirtieth Day of June, 1998

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,550,596
DATED : Aug. 27, 1996
INVENTOR(S) : Christopher H. Strolle, et al It is certified that error appears in the above-identified patent and that said Letters Patent is hereby corrected as shown below:

Title page, insert the following:
-- [73] Assignee: Thomson multimedia S.A.,
              Courbevoie, France--

Signed and Sealed this

Third Day of November, 1998

*Attest:*

BRUCE LEHMAN

*Attesting Officer*         *Commissioner of Patents and Trademarks*